United States Patent
Ebner

(10) Patent No.: US 10,863,052 B2
(45) Date of Patent: Dec. 8, 2020

(54) METHODS AND SYSTEMS FOR AUTOMATICALLY DETECTING AND VALIDATING END-USER PRINT-RELATED PROCESSING USING PRINT DEVICE INFORMATION

(71) Applicant: Xerox Corporation, Norwalk, CT (US)

(72) Inventor: Fritz Francis Ebner, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/439,148

(22) Filed: Jun. 12, 2019

(65) Prior Publication Data

US 2019/0297217 A1  Sep. 26, 2019

Related U.S. Application Data

(62) Division of application No. 15/597,477, filed on May 17, 2017, now Pat. No. 10,367,968.

(51) Int. Cl.
*G06F 7/00* (2006.01)
*H04N 1/32* (2006.01)
(Continued)

(52) U.S. Cl.
CPC ....... *H04N 1/32128* (2013.01); *G06F 3/1206* (2013.01); *G06F 3/1256* (2013.01);
(Continued)

(58) Field of Classification Search
CPC ...... G06F 3/1256; G06F 3/126; G06F 3/1273; G06F 3/1275; H04N 1/00477; H04N 2201/3215
(Continued)

(56) References Cited

U.S. PATENT DOCUMENTS 9,324,038 B2 ‡ 4/2016 Charif ............... G06N 20/00
2005/0043843 A1* 2/2005 Wiechers ............ G06Q 10/06
700/115
(Continued)

OTHER PUBLICATIONS van der Aalst, W.M.P. et al., "Workflow Mining: Discovering process models from event logs", IEEE Transactions on Knowledge and Data Engineering, 2003, vol. 16.‡
(Continued)

*Primary Examiner* — Jamares Q Washington
(74) *Attorney, Agent, or Firm* — Fox Rothschild LLP

(57) ABSTRACT

A system of identifying end-user processes in a print environment receives job data corresponding to jobs that have been processed by one or more print devices in a print environment over a time period, and identifies a plurality of processing operations initiated by a user during the time period. The system determines whether the plurality of processing operations comprise a scan processing operation that was performed after a print processing operation and within a second time period from performance of the print processing operation. In response to determining that the plurality of processing operations comprise a scan processing operation initiated by the user that was performed within the second time period from a print processing operation, the system generates a digital representation of an end user process that includes the first processing operation and the second processing operation, and presents a visual representation of the end user process for validation.

6 Claims, 10 Drawing Sheets

(51) Int. Cl.
*H04N 1/00* (2006.01)
*G06F 3/12* (2006.01)
*H04L 29/08* (2006.01)

(52) U.S. Cl.
CPC .......... *G06F 3/1259* (2013.01); *G06F 3/1273* (2013.01); *G06F 3/1275* (2013.01); *G06F 3/1285* (2013.01); *H04N 1/00477* (2013.01); *H04L 67/18* (2013.01); *H04N 2201/0094* (2013.01); *H04N 2201/3207* (2013.01); *H04N 2201/3215* (2013.01); *H04N 2201/3222* (2013.01); *H04N 2201/3223* (2013.01)

(58) Field of Classification Search
USPC ..................................... 358/1.15; 700/28, 21
See application file for complete search history.

(56) References Cited

U.S. PATENT DOCUMENTS

| | | | | |
|---|---|---|---|---|
| 2007/0136117 | A1‡ | 6/2007 | Matsueda | G06Q 10/06 358/1.15 |
| 2008/0243751 | A1* | 10/2008 | Gormish | G06F 16/93 |
| 2011/0261399 | A1* | 10/2011 | Hattori | H04N 1/32571 358/1.15 |
| 2013/0278964 | A1‡ | 10/2013 | Zeng | G06F 3/1207 358/1.15 |
| 2014/0201747 | A1‡ | 7/2014 | Pattnaik | G06F 11/3006 718/101 |
| 2014/0355043 | A1* | 12/2014 | Zeng | G06F 3/1259 358/1.15 |

OTHER PUBLICATIONS

Liu, Xumin et al., "Incorporating User Behavior Patterns to Discover Workflow Models From Event Logs", 2013 IEEE 20th International Conference on Web Services, Jun. 28-Jul. 3, 2013, Santa Clara, pp. 171-178.‡

Liu, Xumin et al., "Incorporating User Behavior Patterns to Discover Workflow Models From Event Logs", 2013 IEEE 20th International Conference on Web Services, Jun. 28-Jul. 3, 2013, Santa Clara, CA, pp. 171-178.

\* cited by examiner
‡ imported from a related application

| | | | |
|---|---|---|---|
| 12/2/2016 13:59 13.249.151.151 | print | usx23479 | sample-oci-application-form.pdf |
| 12/2/2016 14:02 13.249.151.151 | print | usx23479 | Practice Schedule-Google Calendar |
| 12/2/2016 14:03 13.249.151.151 | print | usx23479 | printable |
| 12/2/2016 14:03 13.249.151.151 | print | usx23479 | printable |
| 12/2/2016 14:03 13.249.151.151 | print | usx23479 | printable |
| 12/2/2016 14:22 13.249.151.151 | email | usx23479 | Email Job 1870 |
| 12/2/2016 14:23 13.249.151.151 | email | usx23479 | Email Job 1871 |
| 12/2/2016 14:25 13.249.151.151 | email | usx23479 | Email Job 1872 |
| 12/2/2016 14:26 13.249.151.151 | email | usx23479 | Email Job 1873 |
| 12/2/2016 14:26 13.249.151.151 | email | usx23479 | Email Job 1874 |

| Date | Time | Device | Operation | User |
|---|---|---|---|---|
| 11/3/2016 | 8:32 | 13.253.150.151 | Print | us723 |
| 11/3/2016 | 8:34 | 13.249.151.151 | Scan | us723 |

*FIG. 5*

| Date | Time | Device | Operation | User |
|------|------|--------|-----------|------|
| 11/3/2016 | 9:47 | 13.253.150.151 | Print | us723 |
| 11/3/2016 | 9:57 | 13.249.151.151 | Scan | us723 |

FIG. 7

METHODS AND SYSTEMS FOR AUTOMATICALLY DETECTING AND VALIDATING END-USER PRINT-RELATED PROCESSING USING PRINT DEVICE INFORMATION

CROSS-REFERENCE TO RELATED APPLICATIONS

This application claims priority to, and is a divisional application of, U.S. patent application Ser. No. 15/597,477, filed May 17, 2017, the disclosure of which is incorporated by reference herein in its entirety.

BACKGROUND

Many print-related workflows are ad hoc, paper intensive, inefficient, overcomplicated and expensive. Print-related workflows are usually understood through costly observation of end-users and consultation with a customer. However, it would be advantageous to automatically discover potential print-related workflows so that they can be validated, improved and optimized. In addition, accurate print-related workflows can be used to make important decisions regarding a print environment such as, for example, the location of users or the positioning of print devices.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system of identifying end-user processes in a print environment includes an electronic device, and a computer-readable storage medium that includes one or more programming instructions that, when executed, cause the electronic device to perform one or more actions. The system receives job data corresponding to one or more jobs that have been processed by one or more print devices in a print environment over a time period, and identifies, from the received job data, a plurality of processing operations initiated by a user during the time period. Each processing operation is a function performed by one or more of the print devices on one or more print jobs, and each processing operation is associated with a timestamp. The system determines whether the plurality of processing operations comprise a scan processing operation that was performed after a print processing operation and within a second time period from performance of the print processing operation. In response to determining that the plurality of processing operations comprise a scan processing operation initiated by the user that was performed within the second time period from a print processing operation, the system generates a digital representation of an end user process that includes the first processing operation and the second processing operation, and presents, via a graphical user interface, a visual representation of the end user process to the user for validation.

Optionally, the system supplements the digital representation of the end user process with one or more supplemental operations. The system may receive, from a location tracking system, an estimated location of the user before the timestamp of the print processing operation, and generate a supplemental operation based on the estimated location and adding the supplemental operation to the digital representation of the end user process.

The system may determine whether a time period between the timestamp of the print processing operation and the timestamp of the scan processing operation exceeds a threshold value. In response to determining that the time period between the timestamp of the print processing operation and the timestamp of the scan processing operation exceeds the threshold value, the system may receive, from a location tracking system, an estimated location of the user during the time period between the timestamp of the print processing operation and the timestamp of the scan processing operation, generate a supplemental operation based on the estimated location, and add the supplemental operation to the digital representation of the end user process.

In an embodiment, a method of identifying end-user processes in a print environment may include receiving, by an electronic device, job data corresponding to one or more jobs that have been processed by one or more print devices in a print environment over a time period, and identifying, from the received job data, a plurality of processing operations initiated by a user during the time period. Each processing operation may be a function performed by one or more of the print devices on one or more print jobs, and each processing operation is associated with a timestamp. The method may include identifying a first processing operation from the plurality of processing operations, where the first processing operation is associated with a first-occurring timestamp, and identifying a second processing operation from the plurality of processing operations, where the second processing operation is associated with a timestamp that next follows the first-occurring timestamp. The method may include determining whether the timestamp of the second processing operation is within a second time period from the first-occurring timestamp, and in response to determining that the timestamp of the second processing operation is within the second time period from the first-occurring timestamp, generating, by the electronic device, an end user process that includes the first processing operation and the second processing operation.

Optionally, the method may include, for one or more other processing operations from the plurality of processing operations: determining whether the other processing operation occurs within the second time period from an immediately preceding processing operation for the user, and in response to determining that the other processing operation occurs within the second time period from the immediately preceding processing operation from the user, adding the other processing operation to the digital representation of the end user process.

Generating the digital representation of the end user process that includes the first processing operation and the second processing operation may include generating the digital representation of the end user process that includes the first processing operation and the second processing operation in response to determining that the first processing operation and the second processing operation are processes of interest for the user.

Optionally, the method may include supplementing the digital representation of the end user process with one or more supplemental operations. Supplementing a digital representation may include identifying one of the processing operations of the end user process and the timestamp associated with the identified processing operation, receiving, from a location tracking system, an estimated location of the user before the timestamp of the identified processing operation, and generating a supplemental operation based on the estimated location and adding the supplemental operation to the digital representation of the end user process.

Optionally, supplementing a digital representation of an end user process with one or more supplemental operations may include identifying a pair of processing operations from the end user process that occur sequentially, determining whether a period of time between the occurrence of a first processing operation in the pair and a second processing operation in the pair exceeds a threshold value, in response to determining that the period of time between the occurrence of the first processing operation in the pair and the second processing operation in the pair exceeds the threshold value, receiving, from a location tracking system, an estimated location of the user during the time period between the occurrence of the first processing operation in the pair and the second processing operation in the pair, and generating a supplemental operation based on the estimated location and adding the supplemental operation to the digital representation of the end user process.

Supplementing an end user process with one or more supplemental operations comprises may include identifying a pair of processing operations from the end user process that occur sequentially, determining whether a period of time between the occurrence of a first processing operation in the pair and a second processing operation in the pair exceeds a threshold value, and in response to determining that the period of time between the occurrence of the first processing operation in the pair and the second processing operation in the pair does not exceed the threshold value, not adding a supplemental operation to the digital representation of the end user process.

Optionally, the method may involve presenting a visual representation of the end user process to the user via a graphical user interface for verification. The visual representation may include, for one or more of the processing operations and/or the supplemental operations in the end user process: an indication of a user who initiated or performed the processing operation or supplemental operation; an indication of the processing operation or supplemental operation; and an approximate location of where the processing operation or supplemental operation was performed.

Optionally, a visual representation includes a validation element corresponding to each of the processing operations or supplemental operations of the end user process. The method may include receiving a selection of the validation element by the user, updating the end user process based on the received selection, and storing the updated end user process in a data store.

The method may include generating a map showing, for each processing operation or supplemental operation of the end user process, an approximate location of where the processing operation or supplemental operation occurred, and presenting the map to the user via the graphical user interface.

BRIEF DESCRIPTION OF THE DRAWINGS

FIG. 3 illustrates example job data according to an embodiment.

FIG. 5 illustrates example job information and an example end user process generated from the job information according to an embodiment.

FIG. 7 illustrates example job information according to an embodiment.

DETAILED DESCRIPTION

Figure 1:
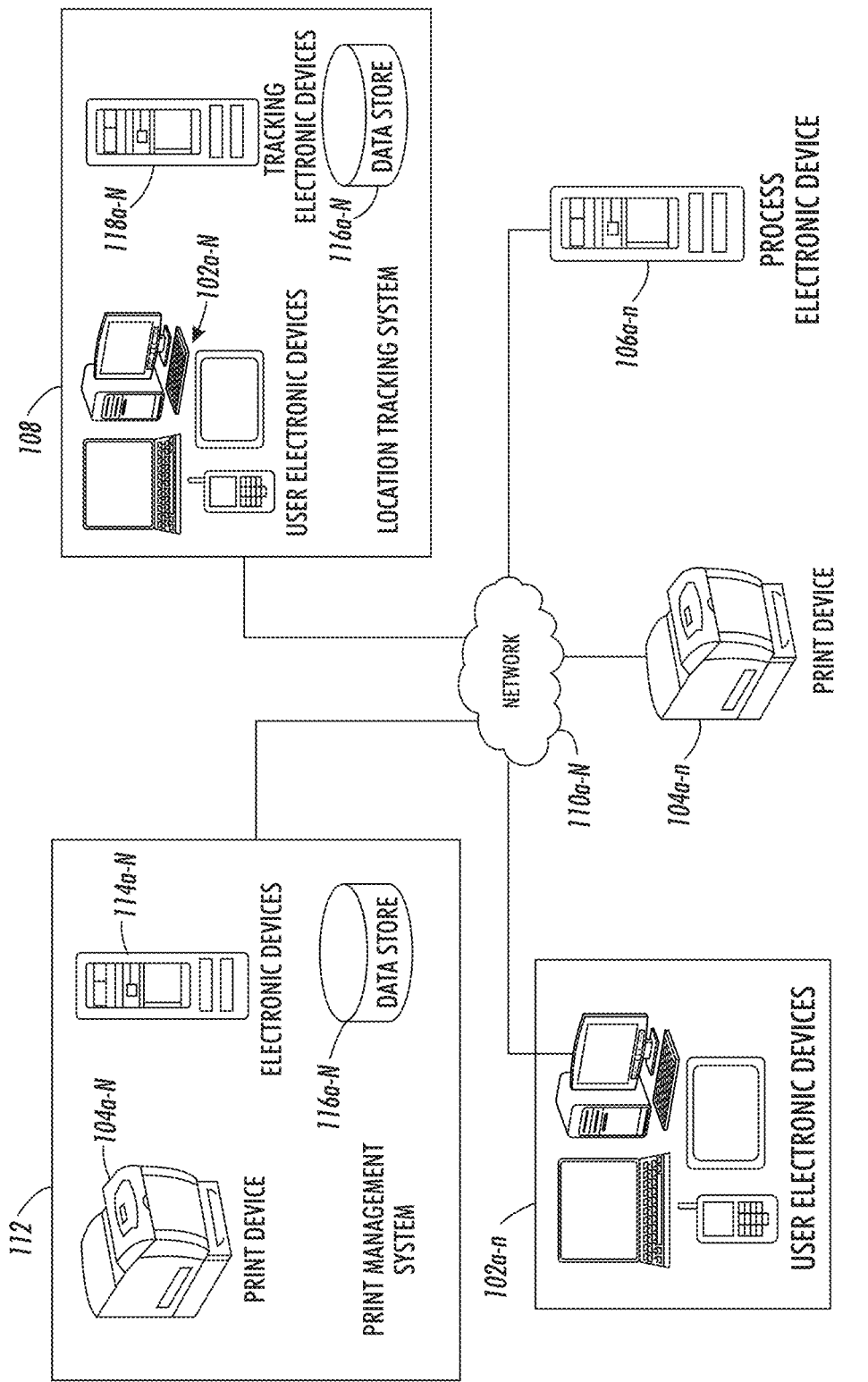
FIG. 1 illustrates an example system for identifying end-user processes according to an embodiment.

The following terms shall have, for purposes of this application, the respective meanings set forth below:

A "digital representation" refers to a digital file or portion thereof that is stored in memory. Example digital representations include files, memory segments, or other blocks of information.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "end user process" refers to one or more steps, performed in a certain order, to accomplish a task. For instance, an example end user process for the submission of a particular form may involve retrieving a document, printing the document, signing the document, and scanning the signed document to a particular destination.

A "location tracking system" refers to a system that stores the location of one or more print devices in an environment.

A "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

A "print environment" refers to a location at which one or more print devices are present. Example print environments include, without limitation, an office (or a floor, a building, or a portion thereof of an office), a manufacturing facility, a print shop and/or the like.

A "processing operation" refers to a function or operation that is performable by an electronic device, such as a print device, on a print job. For example, processing operations of a print device may include fax, copy, scan, print, finishing operations and/or the like.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

FIG. 1 illustrates an example system 100 for identifying end-user processes according to an embodiment. As illustrated by FIG. 1, the system 100 includes one or more user electronic devices 102a-N, one or more print devices 104a-N and one or more process electronic devices 106a-N. In various embodiments, the system 100 may include a location tracking system 108 and/or a print management system 112.

A user electronic device 102a-N may be an electronic device used to create, modify, submit or otherwise process a print job on behalf of a user. Example user electronic devices 102a-N include, without limitation, desktop computers, laptop computers, tablets, mobile electronic devices and/or the like.

A process electronic device 106a-N may be an electronic device that obtains data from one or more other electronic devices, such as for example, user electronic devices and/or print devices, and identifies one or more end user processes from such information. Example process electronic devices 106a-N include, without limitation, mainframes, servers, and/or the like.

A print management system 112 may include one or more print devices 104a-N, one or more electronic devices 114a-N that communicate with the print devices via one or more communication networks, and one or more data stores 116a-N. A print management system may track jobs processed by the print devices 104a-N. For example, a print management system may track a job by a user that initiates the job and a timestamp associated with when the job is processed. The timestamp may be obtained from a clock for the print management system. At least a portion of this information may be stored in the one or more data stores 116a-N.

A location tracking system 108 may include one or more user electronic devices 102a-N, one or more tracking electronic devices 118a-N and/or one or more data stores 120a-N. A tracking electronic device 118a-N may track a location of one or more user electronic devices and/or one or more print devices 104a-N. For instance, a tracking electronic device 118a-N may obtain a location associated with a user electronic device 102a-N at a certain time and identifiers associated with one or more users of the user electronic devices. At least a portion of this information may be stored in one or more data stores 116a-N.

One or more user electronic devices 102a-N, one or more print devices 104a-N, one or more process electronic devices 106a-N, a location tracking system 108, and/or a print management system 112 may communicate with one another via one or more communication networks 110a-N. A communication network 110a-N may be a local area network (LAN), a wide area network (WAN), a mobile or cellular communication network, an extranet, an intranet, the Internet and/or the like.

Figure 2:
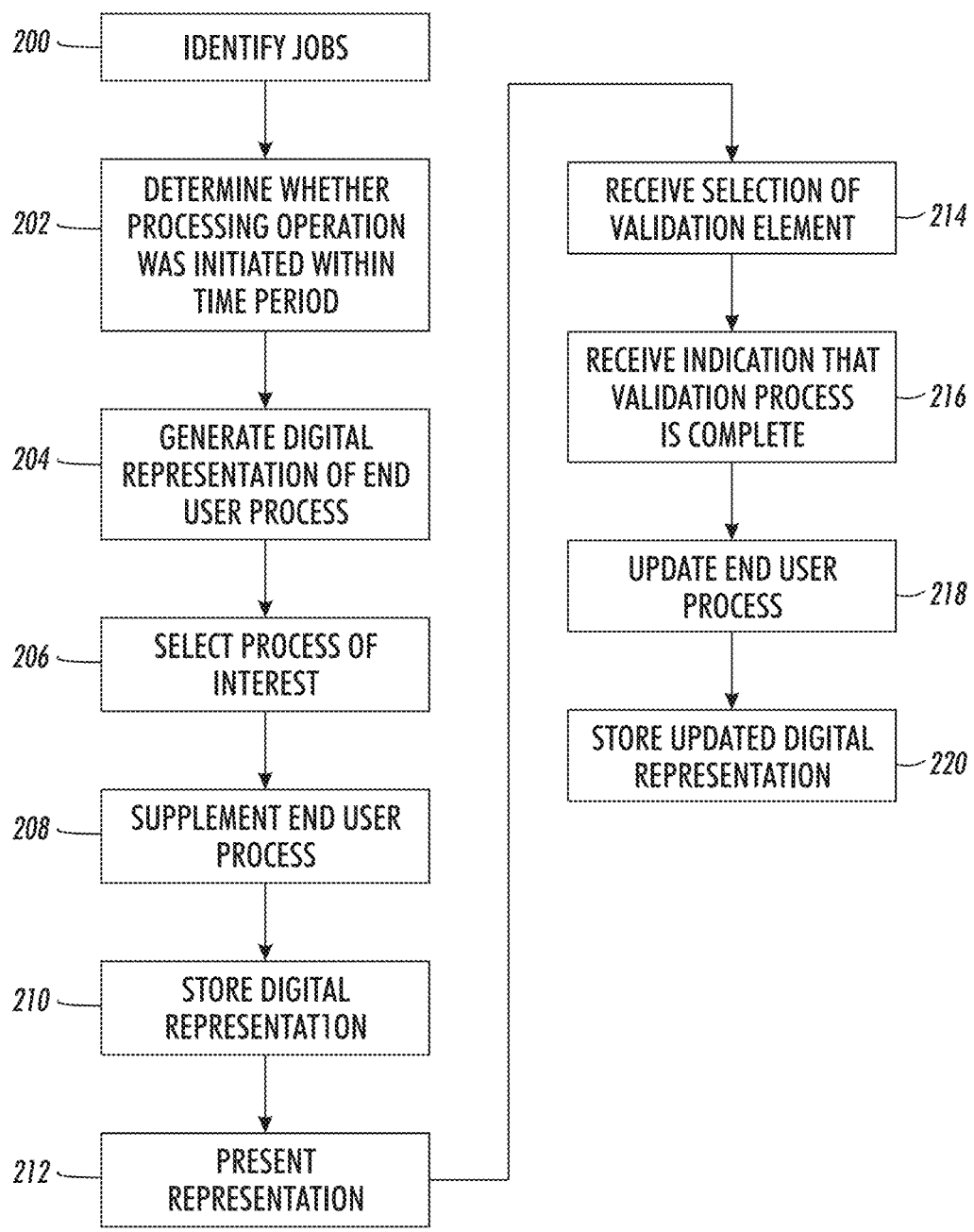
FIG. 2 illustrates an example method of identifying end-user processes according to an embodiment.

FIG. 2 illustrates an example method of identifying end-user processes according to an embodiment. As illustrated in FIG. 2, an electronic device may identify 200 one or more jobs that are processed during a certain time period. Processing a job refers to performing one or more processing operations by one or more print devices. Examples of processing include, without limitation, printing, scanning, emailing, collating, stapling, and/or the like.

In certain embodiments, a time period may be selected or specified by a user, such as an administrator. For instance, a user may want to identify one or more end-user processes that occur during a timeframe, such as, for example, a certain week. In other embodiments, a time period may be a defined period of time. For example, a time period may be the past month. Additional and/or alternate time periods may be used within the scope of this disclosure.

Identifying 200 a job may involve retrieving, from one or more data stores, job data corresponding to one or more jobs processed by one or more print devices over a period of time. Job data may include information such as, for example, a date of processing, an identifier of the print device that processed the job, an indication of the type of processing performed, an identifier of the user who initiated the processing, a description of the job and/or the like. FIG. 3 illustrates example job data according to an embodiment. Job data may be collected and stored in one or more data stores of one or more print devices. Alternatively, print devices may send job data to one or more electronic devices which may store the job data in one or more associated data stores.

The identified print jobs may correspond to a particular user and may be associated with an identifier for the user. A user refers to a person who requested processing of a print job, or on whose behalf processing was requested. For example, a user may log into a network using one or more credentials to print a print job to a network printer. The print submission may be associated with at least part of the user's credentials, such as a user name. As another example, a user may scan a print job using a multifunction device. In order to scan, the user may be required to provide an identifier, such as, for example, an employee number, to the multifunction device. Additional and/or alternate identifiers may be used within the scope of this disclosure.

Referring back to FIG. 2, for one or more users, the system may determine 202 whether the user initiated one or more processing operations within a certain period of time from one or more other processing operations initiated by the user. If the system determines 202 that the user initiated one or more processing operations within the certain time period from one or more other processing operations, the system generates 204 a digital representation of an end-user process that includes the identified processing operations. In various embodiments, the duration of the time period may be specified by a system user or operator, such as a system administrator.

For instance, the system may identify a first processing operation associated with a first-occurring timestamp. The system may identify a second processing operation that is associated with a timestamp that next follows the first occurring timestamp. If the timestamp of the second processing operation is within a time period of the first-occurring timestamp, the system may generate a digital representation of an end user process that includes the first processing operation and the second processing operation.

For example, the first entry in of the job data illustrated in FIG. 3 indicates that user 'usx23479' printed a document on Dec. 2, 2016 at 13:59 to a print device identified by the network address 13.249.151.151. If the time period between processing operations is 30 minutes, the system may analyze the job data to determine whether the same user initiated another processing operation within 30 minutes from this processing operation. FIG. 3 shows that user 'usx23479' did perform another processing operation within 30 minutes from the print operation—specifically, the user printed another document to the same print device at 14:02. As such, the system may generate a digital representation of an end user process that includes a first print operation followed by a second print operation. The system then determines whether the same user initiated another processing operation within 30 minutes of the second print operation. If so, the system adds the processing operation to the digital representation of the end user process. If not, the system determines that the end user process is complete. Although this example uses a time period of 30 minutes, it is understood that alternate time periods may be used within the scope of this disclosure.

Figure 4:
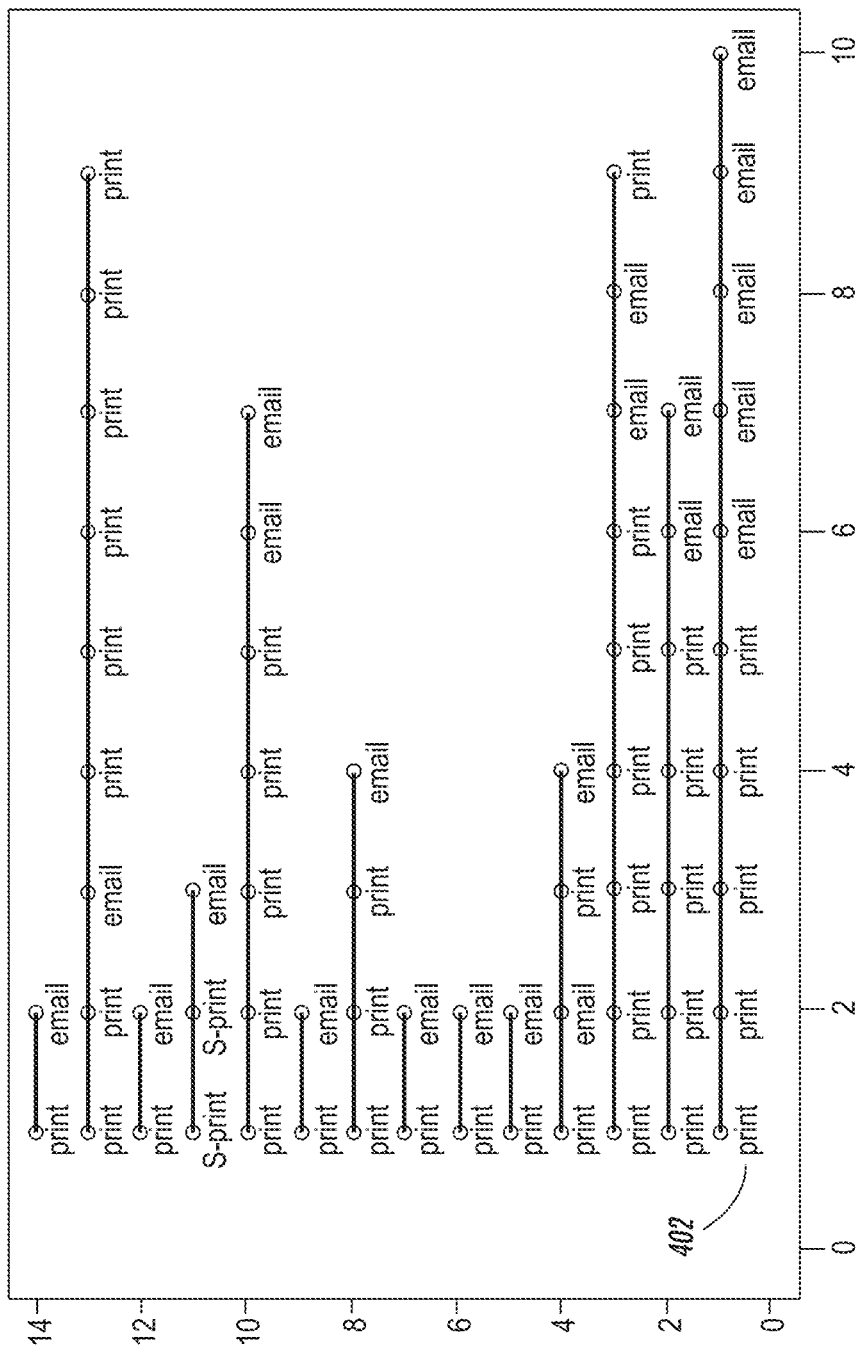
FIG. 4 illustrates example end user processes according to various embodiments.

FIG. 4 illustrates example end user processes corresponding to the job data illustrated in FIG. 3. For example, the job data illustrated in FIG. 3 as 302 is shown in FIG. 4 as end user process 402.

In certain embodiments, the system may select 206 one or more end user processes of interest. An end user process of interest may be one that meets one or more parameters or criteria. The specific parameters or criteria may be specified by a system user or operator.

For example, the system may select 206 one or more end user processes of interest from the generated end user processes that include one or more certain processing operations. For instance, the system may select an end user process of interest if the processing operations include at least one print operation and at least one scan operation. As another example, the system may select an end user process of interest if the processing operations include a scan operation that is performed within a certain time period from a print operation. Additional and/or alternate processing operations or combinations of processing operations may be used within the scope of this disclosure. In other embodiments, the system may select 206 all of the end user processes as end user processes of interest.

In various embodiments, the system may supplement 208 one or more end user processes. Supplementing 208 an end user process involves predicting one or more supplemental operations that occur before, after and/or between one or more of the processing operations of an end user process. A supplemental operation may be a processing operation or it may be a step that is performed by a user or other. Example supplemental operations may include, without limitation, walking to or from a location, completing a form or document, signing a form or document and/or the like.

For example, a system may use locational information to predict one or more supplemental steps to an end user process. A system may be in communication with a location tracking system. A location tracking system may be able to determine the location of one or more print devices and/or one or more users in a print environment. For instance, a location tracking system may be associated with one or more data stores that stores information about the location of one or more print devices in a print environment such as, for example, one or more coordinates or other positional information. A location tracking system may track a location of one or more users within a print environment. For example, a location tracking system may tracking the location of one or more registered devices of a user within a print environment using wireless signals or near-field communication techniques, such as, for example Bluetooth.

FIG. 5 illustrates example job information 500 according to an embodiment. As an example, the system may identify from the job information the time that the first processing operation was performed. The system may obtain from a location tracking system an approximate location of the user before the first processing operation was performed. For example, the system may obtain from a location tracking system a location of an electronic device of the user that is registered with the location tracking system five minutes before the print operation that occurred at 8:32 am on Nov. 3, 2016. The system may then predict that the step that preceded the print operation was that the user walked from the determined location to the location of the print device that performed the print operation.

Figure 6:
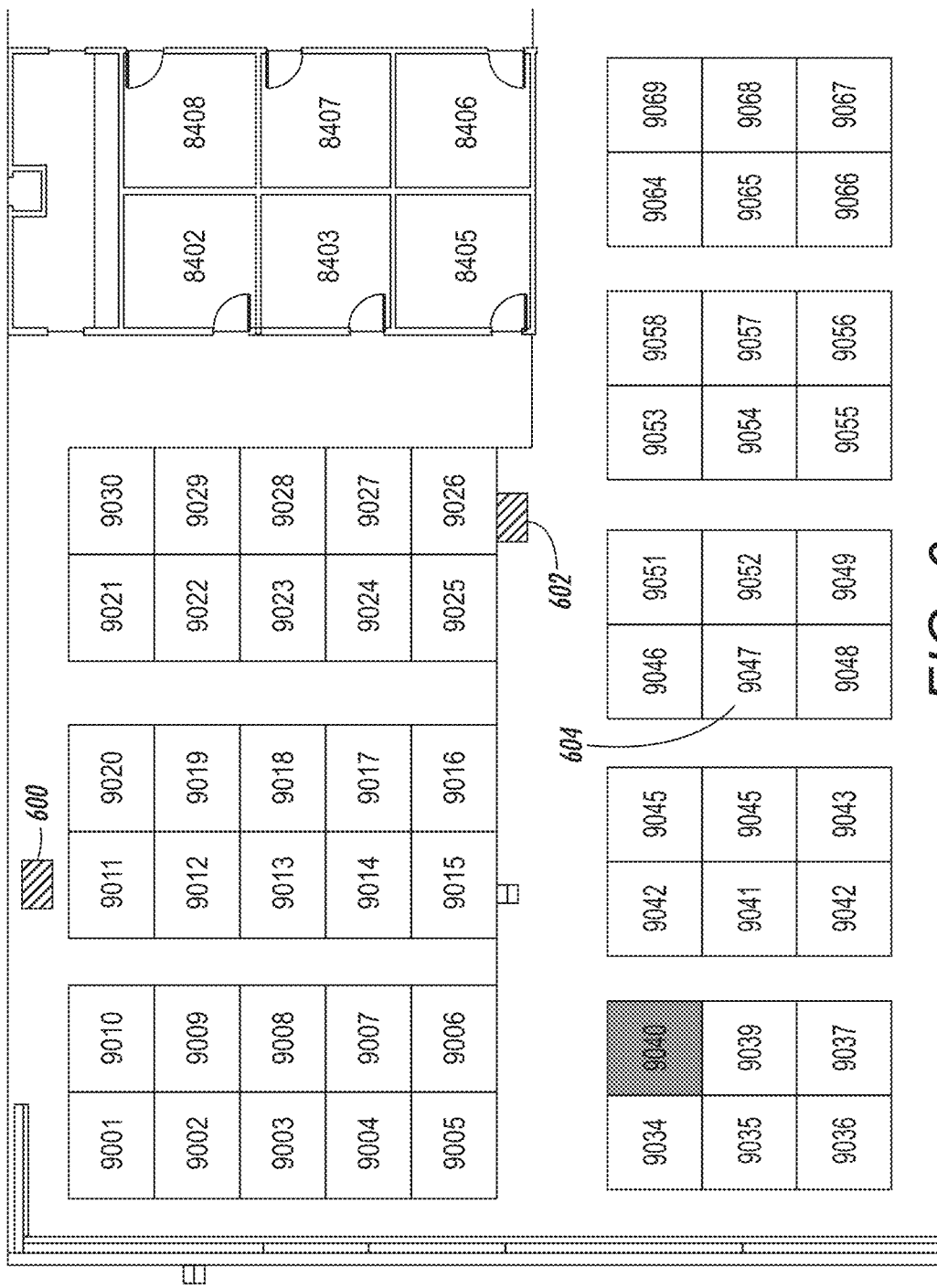
FIG. 6 illustrates an example map of a print environment according to an embodiment.

To further illustrate this example, FIG. 6 illustrates an example map of a print environment according to an embodiment. FIG. 6 shows the location of Print Device A 600 and Scan Device B 602 used to process the job in accordance with the job information illustrated in FIG. 5. FIG. 6 also illustrates the location of a user workstation 604. The system may determine, based on information received from a location tracking system, that user "us723" was in proximity of his workstation around 8:30 am on Nov. 3, 2016. As such, the system may supplement the end user process with a step that precedes the print processing operation that indicates that the user walked to Print Device A.

The system may compare the time of one processing operation to the time of a subsequent processing operation to determine whether one or more steps may have occurred between the two processing operations. For instance, if the time between processing operations exceeds a threshold value, the system may presume that one or more steps were performed between the two processing operations. Otherwise, the system may presume that the subsequent processing operation is the next step in the end user process.

For example, referring to FIG. 5, the system may determine that there are two minutes between the print processing operation and the scan processing operation. If the threshold value is 9 minutes, the system may determine that the user walked directly from Print Device A to Scan Device B.

As another example, FIG. 7 illustrates example job information. As illustrated, there is a 10 minute time period between the print processing operation and the scan processing operation. This time period exceeds the threshold value of 9 minutes, so the system may determine a location of the user during this 10 minute timeframe. For instance, the system may query the location tracking system to obtain the user's approximate location during a relevant time period. In this example, the system may determine that the user was located near his workstation between 9:47 am and 9:57 am on Nov. 4, 2016. As such, the system may presume that the user walked from Print Device A to his workstation, and then walked from his workstation to Scan Device A.

In various embodiments, a system may supplement 208 an end user process based on an order in which processing operations were performed. A system may apply one or more rules or heuristics to an end user process to supplement an end user process. For instance, one or more print processing operations followed by a scan processing operation may correspond to a rule that indicates that the user likely completed a form before scanning it. As such, the system may supplement an end user process with a step of completing a form.

Referring back to FIG. 2, a system may store 210 a generated digital representation of an end user process. For example, a system may store 210 an end user process in one or more data stores.

Figure 8:
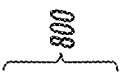
FIG. 8 illustrates an example representation of an end user process according to an embodiment.

A system may present 212 a representation of an end user process to a user for verification, approval, validation and/or the like. For instance, a system may present 212 a representation of an end user process to a user via a graphical user interface, such as one of a user electronic device. FIG. 8 illustrates an example representation of an end user process according to an embodiment. As shown by FIG. 8, the representation may include an indication of the user who performed an action, the action that was performed, and an approximate location of where the action was performed. For instance, the representation shown in FIG. 8 shows a representation of an end user process having three steps. The first step is printing Document A at Multifunction Device 1 by user U1. The second step is user U1 completing Document A, and the third step is scanning Document A at Multifunction Device 1 by user U1.

As shown in FIG. 8, one or more steps of an end user process may be associated with a validation element 800. A validation element refers to a user interface mechanism for indicating whether a step is accurate or not. Example validation elements include, without limitation, a toggle switch, a radio button, a drop down menu, one or more hyperlinks, a text box, and/or the like.

Figure 9:
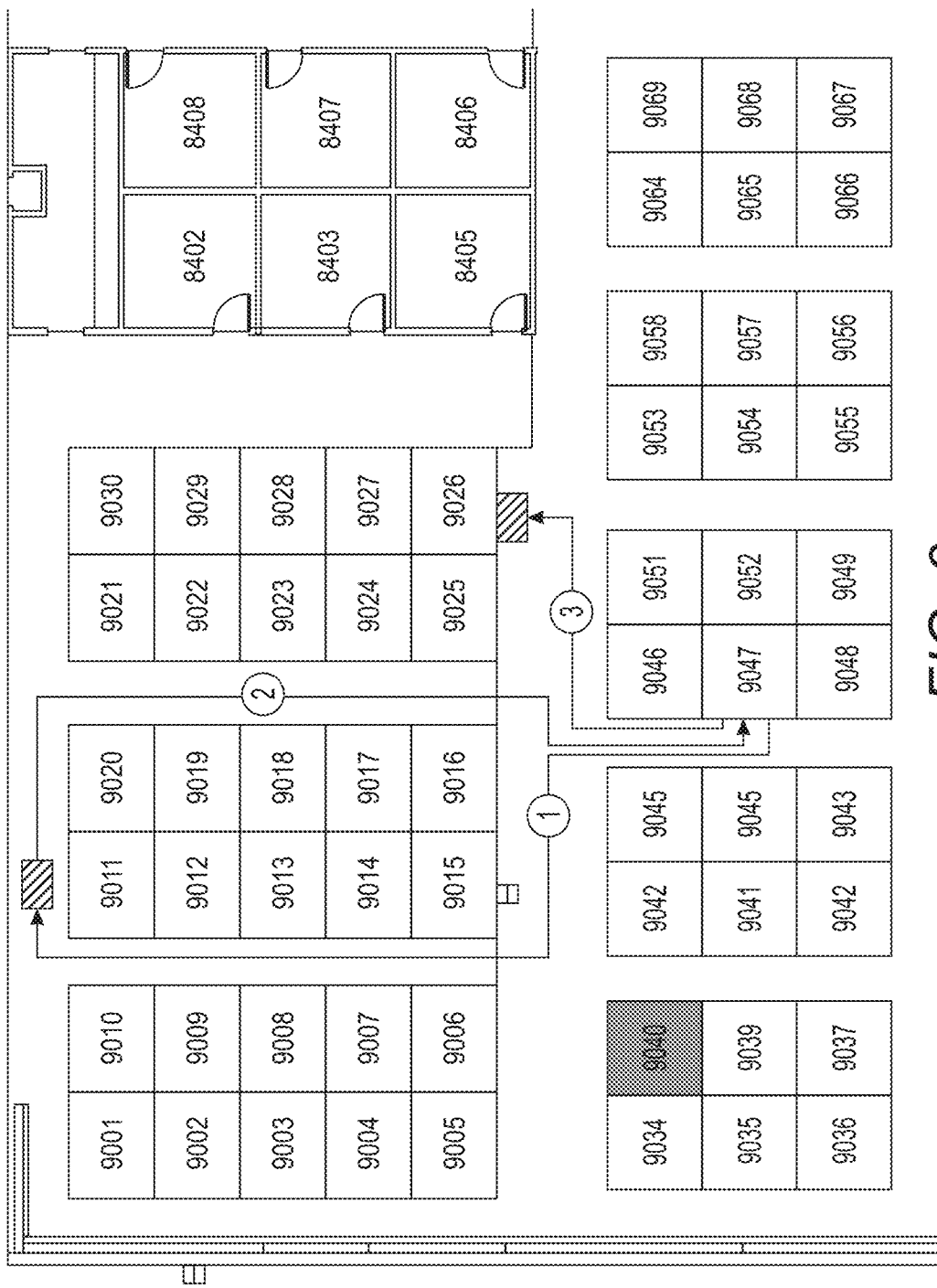
FIG. 9 illustrates an example map of a print environment according to an embodiment.

In various embodiments, one or more steps of an end user process may be shown as part of a visual representation. For instance, an electronic device may generate a map showing one or more steps of an end user process performed at one or more locations illustrated by the map. FIG. 9 illustrates an example map showing a representation of an end user process according to an embodiment.

Referring back to FIG. 2, the system may receive 214 a selection of one or more validation elements. For instance, a user may select a validation element to indicate whether a step is correct or incorrect. As another example, a step may be associated with a validation element having a default correct value. If the user would like to indicate that the step is in fact incorrect, the user may select the validation element.

The system may receive 216 an indication that the user validation process is complete. For instance, a user may select a button or other element to indicate that the user is through validating an end user process. The system may update 218 the digital representation of the end user process with the user's feedback, if any, and may store 220 the updated digital representation of the end user process in one or more data stores.

Automatically detecting end user processes by analyzing processing operations performed by a user within a time period provides an accurate baseline that can be validated or adjusted by the user. Automating the discovery process provides a faster and more efficient way of identifying potential end user processes, especially in environments that support a large number of possible end user processes.

Figure 10:
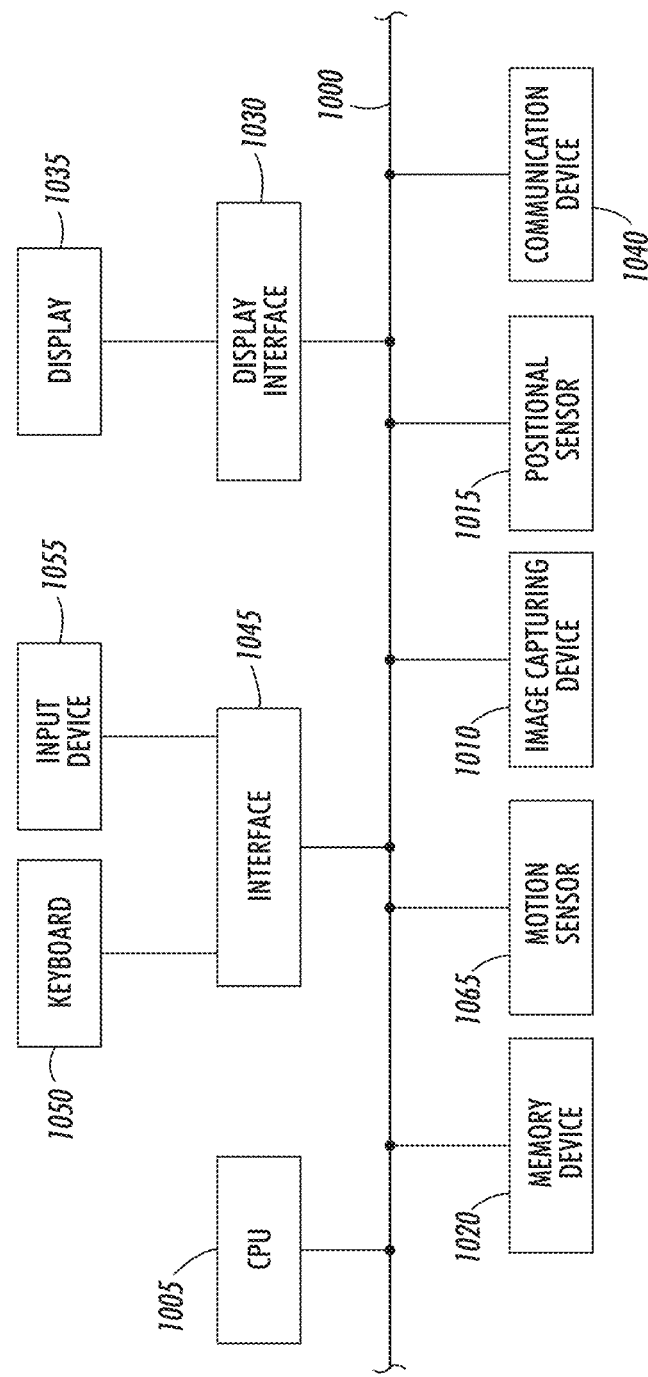
FIG. 10 illustrates a block diagram of example hardware that may be used to contain or implement program instructions according to an embodiment.

FIG. 10 depicts a block diagram of hardware that may be used to contain or implement program instructions, such as those of a cloud-based server, electronic device, virtual machine, or container. A bus 1000 serves as an information highway interconnecting the other illustrated components of the hardware. The bus may be a physical connection between elements of the system, or a wired or wireless communication system via which various elements of the system share data. Processor 1005 is a processing device that performs calculations and logic operations required to execute a program. Processor 1005, alone or in conjunction with one or more of the other elements disclosed in FIG. 10, is an example of a processing device, computing device or processor as such terms are used within this disclosure. The processing device may be a physical processing device, a virtual device contained within another processing device, or a container included within a processing device.

A memory device 1020 is a hardware element or segment of a hardware element on which programming instructions, data, or both may be stored. Read only memory (ROM) and random access memory (RAM) constitute examples of memory devices, along with cloud storage services.

An optional display interface 1030 may permit information to be displayed on the display 1035 in audio, visual, graphic or alphanumeric format. Communication with external devices, such as a printing device, may occur using various communication devices 1040, such as a communication port or antenna. A communication device 1040 may be communicatively connected to a communication network, such as the Internet or an intranet.

The hardware may also include a user input interface 1045 which allows for receipt of data from input devices such as a keyboard or keypad 1050, or other input device 1055 such as a mouse, a touch pad, a touch screen, a remote control, a pointing device, a video input device and/or a microphone. Data also may be received from an image capturing device 1020 such as a digital camera or video camera. A positional sensor 1015 and/or motion sensor 1065 may be included to detect position and movement of the device. Examples of motion sensors 1065 include gyroscopes or accelerometers. An example of a positional sensor 1015 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of identifying end-user processes in a print environment, the method comprising:
receiving, by an electronic device, job data corresponding to one or more jobs that have been processed by one or more print devices in a print environment over a time period;

identifying, from the received job data, a plurality of processing operations initiated by a user during the time period, wherein each processing operation is a function performed by one or more of the print devices on one or more print jobs, wherein each processing operation is associated with a timestamp;

determining, by the electronic device, whether the plurality of processing operations comprise a scan processing operation that was performed after a print processing operation, wherein the scan processing operation was performed within a second time period from performance of the print processing operation; and in response to determining that the plurality of processing operations comprise a scan processing operation initiated by the user that was performed within the second time period from a print processing operation, generating, by the electronic device, a digital representation of an end user process that includes the scan processing operation and the print processing operation, determining whether a period of time between the timestamp of the print processing operation and the timestamp of the scan processing operation exceeds a threshold value, in response to determining that the period of time between the timestamp of the print processing operation and the timestamp of the scan processing operation exceeds the threshold value:
  determining one or more supplemental operations that occurred between the print processing operation and the scan processing operation, and
  adding one or more of the one or more supplemental operations to the digital representation of the end user process, and presenting, via a graphical user interface, a visual representation of the end user process to the user for validation.

2. The method of claim 1, wherein determining one or more supplemental operations comprises:
  receiving, from a location tracking system, an estimated location of the user before the timestamp of the print processing operation; and
  generating a supplemental operation based on the estimated location.

3. The method of claim 1, wherein determining one or more supplemental operations comprises:
  receiving, from a location tracking system, an estimated location of the user during the time period between the timestamp of the print processing operation and the timestamp of the scan processing operation; and
  generating a supplemental operation based on the estimated location.

4. A system of identifying end-user processes in a print environment, the system comprising:
  an electronic device; and
  a computer-readable storage medium comprising one or more programming instructions that, when executed, cause the electronic device to:
    receive job data corresponding to one or more jobs that have been processed by one or more print devices in a print environment over a time period,
    identify, from the received job data, a plurality of processing operations initiated by a user during the time period, wherein each processing operation is a function performed by one or more of the print devices on one or more print jobs, wherein each processing operation is associated with a timestamp,
    determine whether the plurality of processing operations comprise a scan processing operation that was performed after a print processing operation, wherein the scan processing operation was performed within a second time period from performance of the print processing operation, and
    in response to determining that the plurality of processing operations comprise a scan processing operation initiated by the user that was performed within the second time period from a print processing operation, generate a digital representation of an end user process that includes the scan processing operation and the print processing operation,
    determine whether a period of time between the timestamp of the print processing operation and the timestamp of the scan processing operation exceeds a threshold value,
    in response to determining that the period of time between the timestamp of the print processing operation and the timestamp of the scan processing operation exceeds the threshold value:
      determine one or more supplemental operations that occurred between the print processing operation and the scan processing operation, and
      add one or more of the one or more supplemental operations to the digital representation of the end user process, and
    present, via a graphical user interface, a visual representation of the end user process to the user for validation.

5. The system of claim 4, wherein the one or more programming instructions that, when executed, cause the electronic device to determine one or more supplemental operations comprise one or more programming instructions that, when executed, cause the electronic device to:
  receive, from a location tracking system, an estimated location of the user before the timestamp of the print processing operation; and
  generate a supplemental operation based on the estimated location.

6. The system of claim 4, wherein the one or more programming instructions that, when executed, cause the electronic device to determine one or more supplemental operations comprise one or more programming instructions that, when executed, cause the electronic device to:
  receive, from a location tracking system, an estimated location of the user during the time period between the timestamp of the print processing operation and the timestamp of the scan processing operation; and
  generate a supplemental operation based on the estimated location.

* * * * *